(12) United States Patent
LeVey et al.

(10) Patent No.: US 6,568,893 B2
(45) Date of Patent: May 27, 2003

(54) DOUBLE QUARTER TURN FASTENER

(75) Inventors: Kenneth LeVey, West Chicago, IL (US); Franco Cisternino, Highwood, IL (US)

(73) Assignee: Illinois Tool Works Inc., Glenview, IL (US)

(*) Notice: Subject to any disclaimer, the term of this patent is extended or adjusted under 35 U.S.C. 154(b) by 56 days.

(21) Appl. No.: 09/865,170

(22) Filed: May 24, 2001

(65) Prior Publication Data

US 2002/0176766 A1 Nov. 28, 2002

(51) Int. Cl.[7] ................................................. F16B 21/18
(52) U.S. Cl. ........................................ 411/349; 411/553
(58) Field of Search ................................. 411/349, 549, 411/550, 552, 553, 554, 555, 350; 297/DIG. 53, DIG. 54, DIG. 56, DIG. 60

(56) References Cited

U.S. PATENT DOCUMENTS

| | | | |
|---|---|---|---|
| 2,281,443 A | | 4/1942 | Jones |
| 2,327,327 A | | 8/1943 | Maynard |
| 3,220,078 A | * | 11/1965 | Preziosi |
| 3,362,672 A | | 1/1968 | Wigam |
| 3,407,454 A | * | 10/1968 | Myatt |
| 3,443,783 A | * | 5/1969 | Fisher |
| 3,811,157 A | * | 5/1974 | Schenk |
| 3,893,208 A | | 7/1975 | Yuda |
| 3,921,261 A | * | 11/1975 | Fisher |
| 4,131,258 A | * | 12/1978 | Okuda |
| 4,262,394 A | | 4/1981 | Wright |
| RE30,801 E | * | 11/1981 | Gley |
| 4,652,192 A | | 3/1987 | Schaller |
| 4,762,437 A | | 8/1988 | Mitomi |
| 4,810,147 A | | 3/1989 | Hirohata |
| 4,938,645 A | | 7/1990 | Wollar |
| 4,981,405 A | | 1/1991 | Kato |
| 5,011,356 A | | 4/1991 | Fernandez |
| 5,620,291 A | * | 4/1997 | Hayes |
| 5,897,278 A | | 4/1999 | Frattarola |

* cited by examiner

*Primary Examiner*—Flemming Saether
(74) *Attorney, Agent, or Firm*—Pitney, Hardin, Kipp & Szuch LLP (57) ABSTRACT

The apparatus is a double quarter turn fastener which includes a first element with a head, a square seat, and prongs extending from inwardly adjacent to the sides of the seat outwardly so as to terminate in surfaces with hemispherically extending nubs. The double quarter turn fastener further includes a second element which engages the first element by detent elements or by a rotatable snap fit.

5 Claims, 9 Drawing Sheets

DOUBLE QUARTER TURN FASTENER

BACKGROUND OF THE INVENTION

1. Field of the Invention

This invention pertains to a two-stage quarter turn fastener which is used to fasten adjacent panels to each other.

2. Description of the Prior Art

In the prior art, it is known to use a fastener to secure adjacent panels to each other. Quarter turn fasteners are frequently used, particularly when square apertures are formed in the panels. However, such prior art fasteners typically have not been able to accommodate a range of panel thicknesses. Moreover, such prior art fasteners typically have not been configured to remain fastened to a first panel without being fastened to the second panel.

Examples of prior art include U.S. Pat. No. 5,897,278 entitled "Turn Fastener", issued on Apr. 27, 1999 to Frattarola; U.S. Pat. No. 5,011,356 entitled "Panel Fastener", issued on Apr. 30, 1991 to Fernandez; U.S. Pat. No. 4,981,405 entitled "Fastener For Securing Panel-Like Members", issued on Jan. 1, 1991 to Kato; U.S. Pat. No. 4,938,645 entitled "Tee Tree Fastener", issued on Jul. 3, 1990 to Wollar; U.S. Pat. No. 4,810,147 entitled "Fastener for Plates", issued on Mar. 7, 1989 to Hirohata; U.S. Pat. No. 4,762,437 entitled "Fastener", issued on Aug. 9, 1988 to Mitomi; and U.S. Pat. No. 4,652,192 entitled "Expandable, Plastic Panel Fastener", issued on Mar. 24, 1987.

OBJECTS AND SUMMARY OF THE INVENTION

It is therefore an object of the present invention to provide a quarter turn fastener configuration which can engage panels over a range of thicknesses.

It is therefore a further object of the present invention to provide a quarter turn fastener which can engage two panels or a single panel.

It is therefore a still further object of the present invention to provide a quarter turn fastener which can be reliably and intuitively operated.

It is therefore a final object of the present invention to provide a quarter turn fastener which can be manufactured economically.

These and other objects are attained by providing a fastener assembly with two quarter turn fasteners.

DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Referring now to the drawings in detail wherein like numerals indicate like elements throughout the several views, FIGS. 1–7 disclose various views of the first aspect of the fastener assembly 10 of the present invention. Fastener assembly 10 includes first stage 12 and second stage 14. First stage 12 and second stage 14 are typically made from molded plastic, although those skilled in the art may recognize a range of equivalent substitutions.

Figure 5:
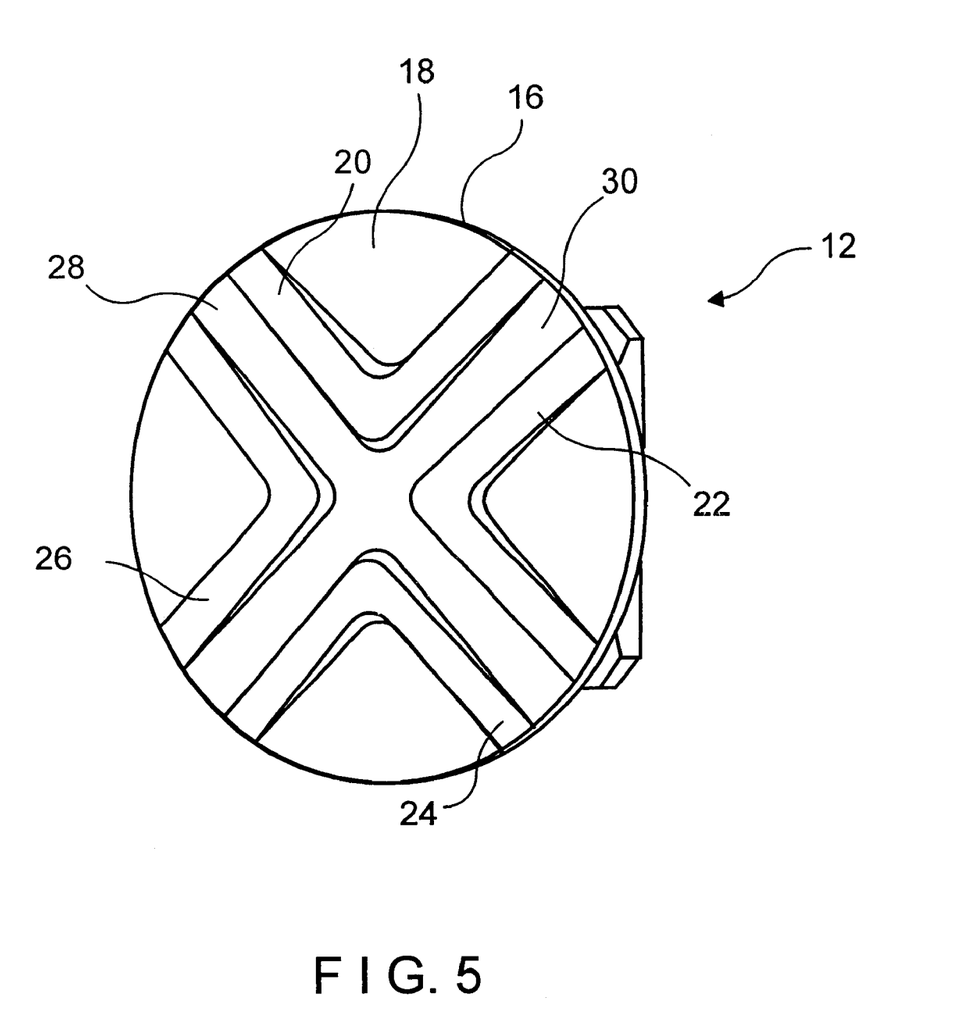
FIG. 5 is a perspective view of the head of the first aspect of the double quarter turn fastener of the present invention.

First stage 12 includes disk-shaped head 16 with external surface 18 with, as shown in FIG. 5, L-shaped lands 20, 22, 24, 26 which form intersecting orthogonal grooves 28, 30 thereby forming a Phillips head-type configuration. First stage 12 further includes post 32 which rises from disk-shaped head 16 and terminates in distal end 34. Locking flanges 36, 38 extend orthogonally from distal end 34. Square-shaped seat 40 with sides 42, 44, 46, 48 is formed on interior side 50 of disk-shaped head 16. Prongs 52, 54, 56, 58 are formed inwardly adjacently from sides 42, 44, 46, 48, respectively, and extend obliquely outward therefrom and terminating in surfaces 52a, 54a, 56a, 58a which are generally parallel with disk-shaped head 16. As can be seen from FIGS. 3 and 4, the exterior walls of prongs 52, 54, 56, 58 are aligned with the exterior walls of adjacent prongs thereby forming lines of a square generally at 45° angles with sides 42, 44, 46, 48 of seat 40.

Figure 1:
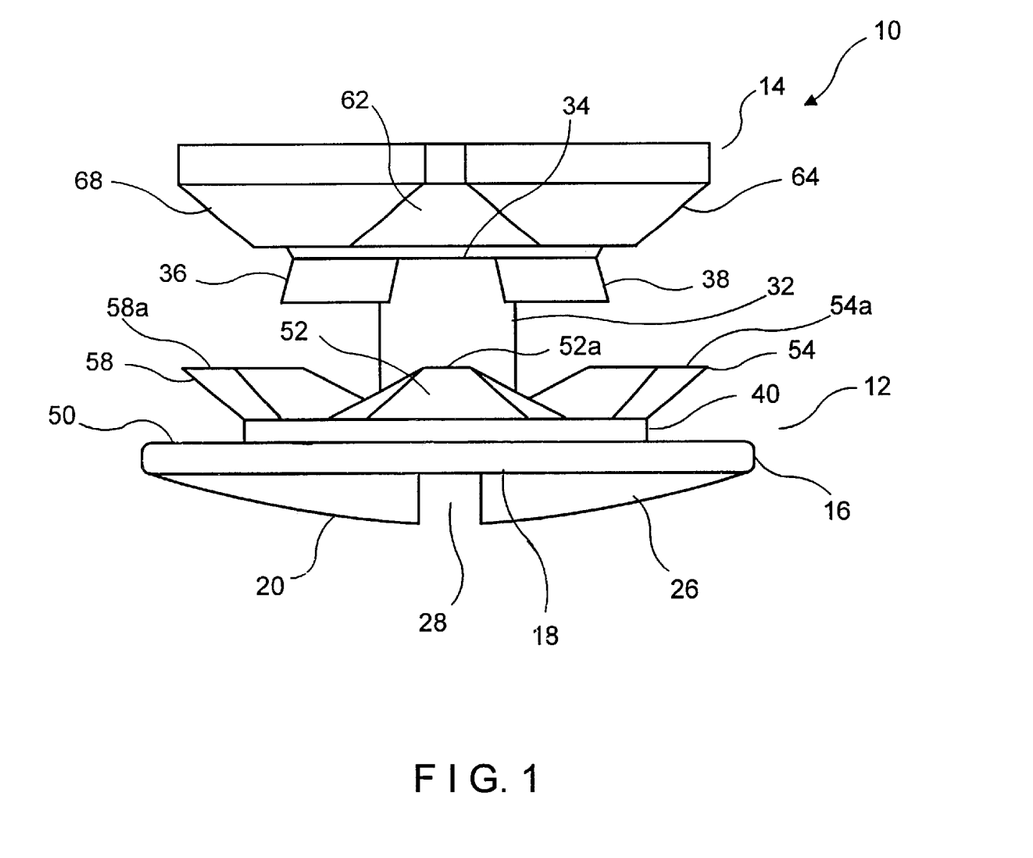
FIG. 1 is a side plan view of the first aspect of the double quarter turn fastener of the present invention.
Figure 2:
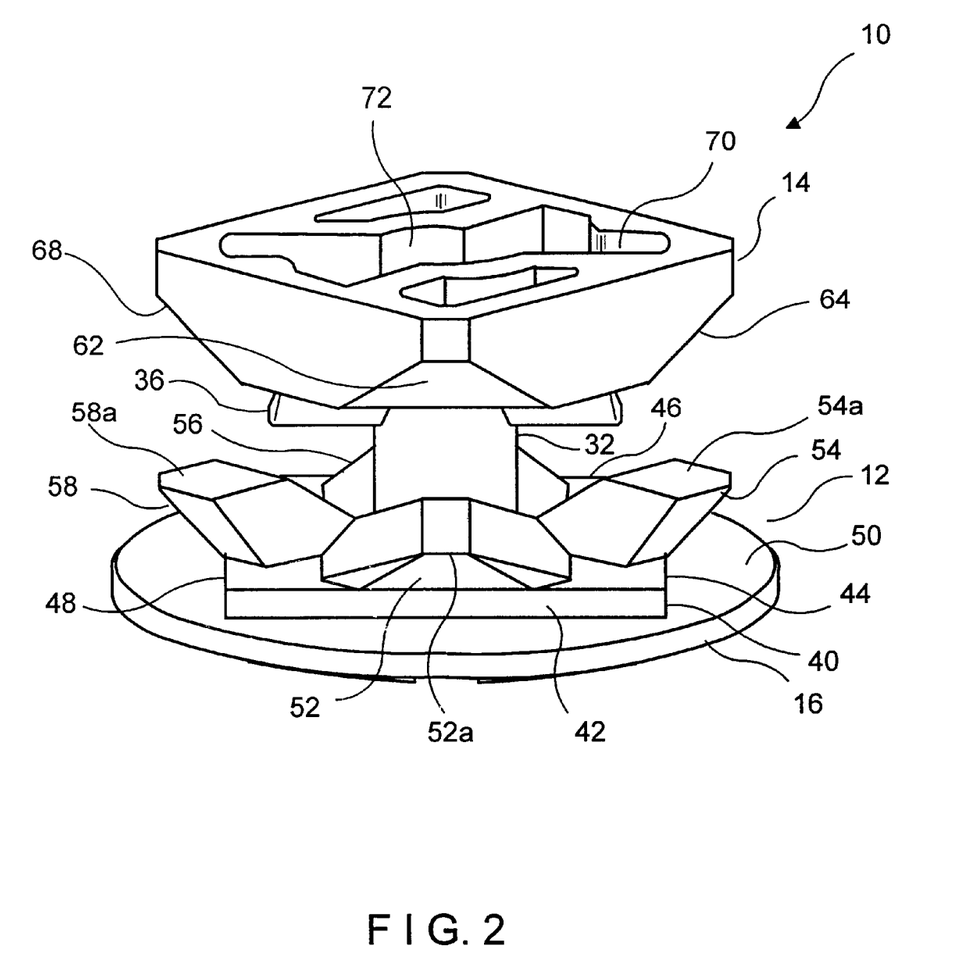
FIG. 2 is a perspective view of the first aspect of the double quarter turn fastener of the present invention.
Figure 3:
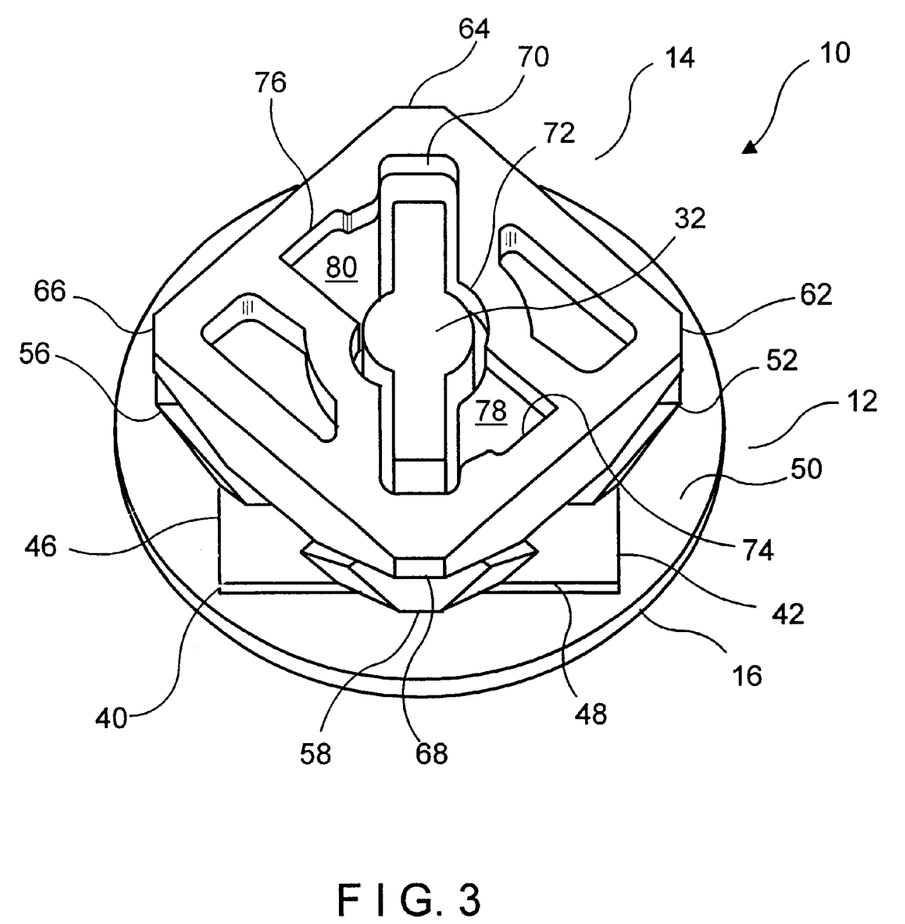
FIG. 3 is a top perspective view of the first aspect of the double quarter turn fastener of the present invention, shown in the unfastened configuration.
Figure 4:
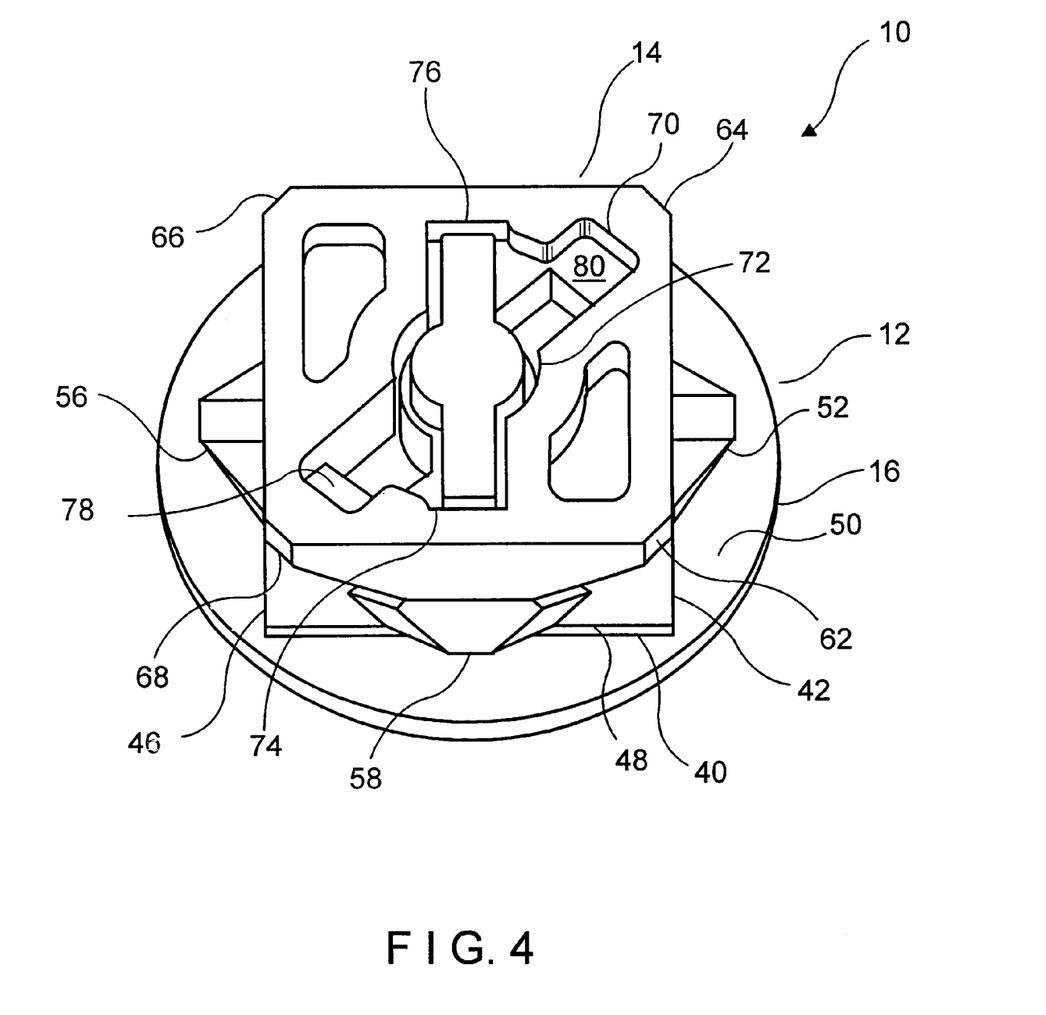
FIG. 4 is a top perspective view of the first aspect of the double quarter turn fastener of the present invention, shown in the fastened configuration.
Figure 6:
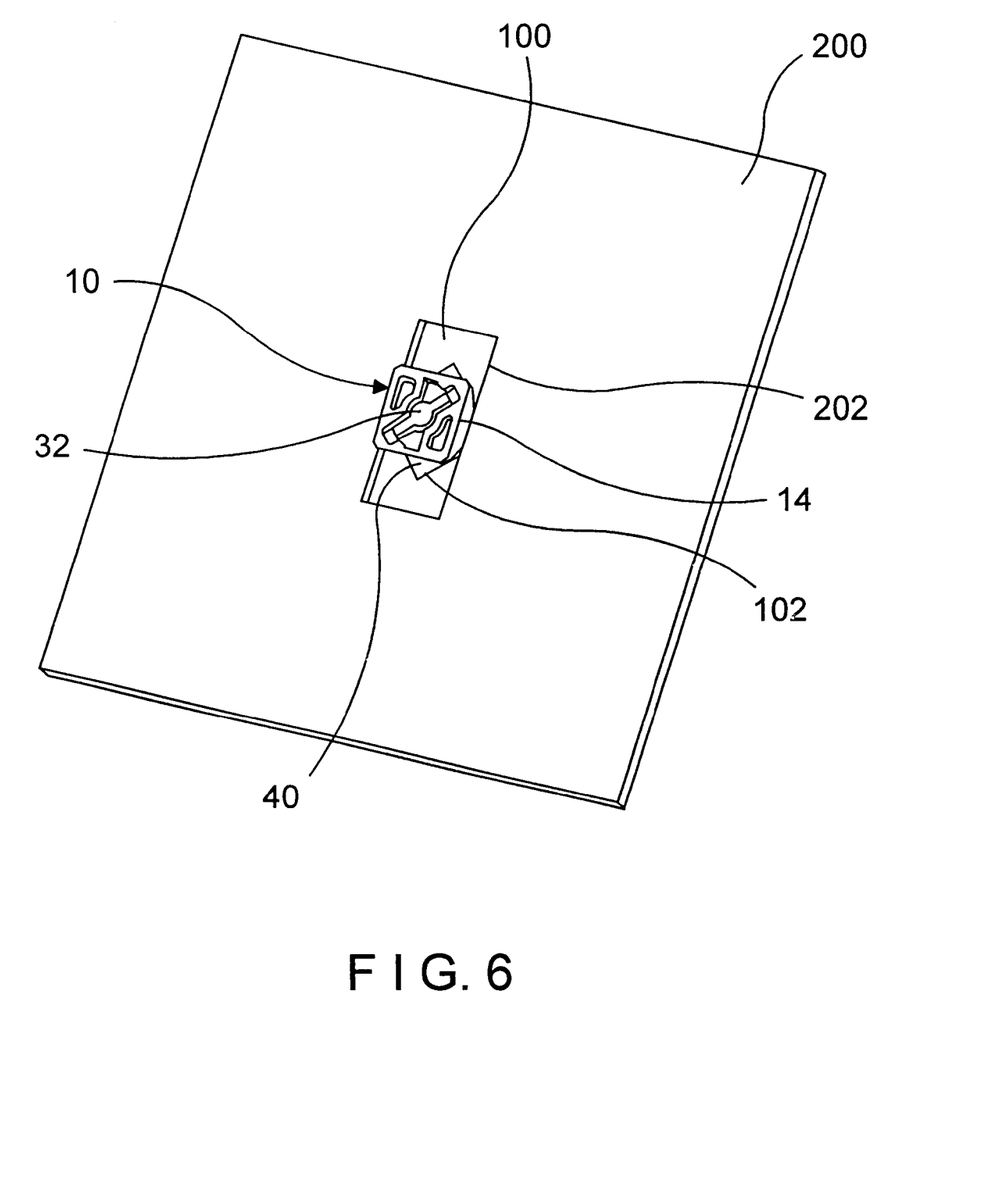
FIG. 6 is a perspective view of the first aspect of the double quarter turn fastener of the present invention, shown in position with two panels, in the unfastened configuration.

Second stage 14 has a generally square cross section when viewed from above, and includes chamfered lower corners 62, 64, 66, 68. Additionally, second stage 14 includes a diagonally oriented channel 70 passing therethrough. Diagonally oriented channel 70 includes an enlarged central circular portion 72. Diagonally oriented channel 70 allows locking flanges 36, 38 to pass through second stage 14, with post 32 extending through enlarged central circular portion as shown in FIGS. 3 and 6. Pie-shaped locking pockets 74, 76 are formed adjacent to diagonally oriented channel 70, extend generally radially from enlarged central circular portion 72, and pass partially through second stage 14 and are bounded by floors 78, 80. As shown in FIG. 3, this engaged but unlocked configuration causes chamfered corners 62, 64, 66, 68 to face surfaces 52a, 54a, 56a, 58a of square-shaped seat 40. The configuration of FIGS. 3 and 6 allows second stage 14 to be rotated 45° about post 32 so that locking flanges 36, 38 are engaged within locking pockets 74, 76 to reach the locked configuration shown in FIGS. 4 and 7. In this locked position, chamfered corners 62, 64, 66, 68 are aligned with the corners of square-shaped seat 40.

Figure 7:
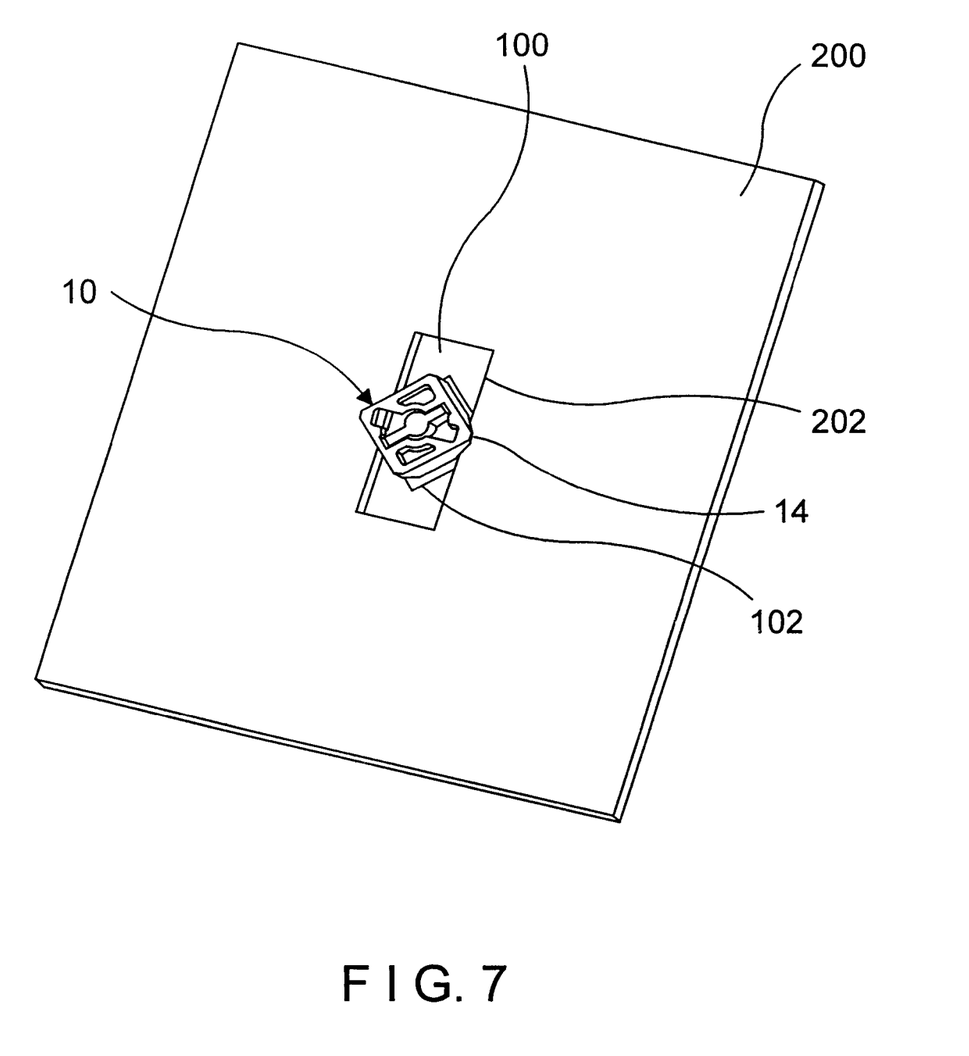
FIG. 7 is a perspective view of the first aspect of the double quarter turn fastener of the present invention, shown in the installed and fastened configuration with two panels.
Figure 8:
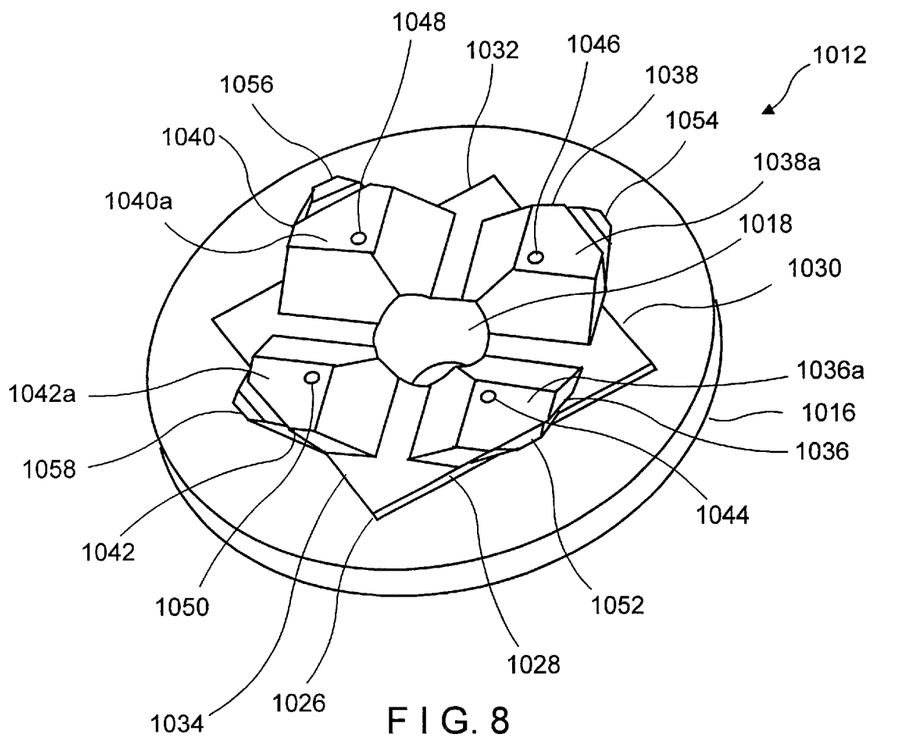
FIG. 8 is a perspective view of the interior of the first stage of the second aspect of the double quarter turn fastener of the present invention.

A typical installation procedure is illustrated in FIGS. 6 and 7. As shown in FIG. 6, first stage 12 is engaged but not fastened to second stage 14 (similar to FIG. 3). Head 16 is hidden behind first panel 100 with post 32 extending through square-shaped aperture 102 into which square-shaped seat 40 has seated. Post 32 further extends through rectangular aperture 202 in second panel 200 (the smaller side of rectangular aperture 202 being approximately equal in length to the width of second stage 14). Second stage 14 is thereafter rotated 45° to reach the locked configuration shown in FIGS. 4 and 7. During rotation of second stage 14, chamfered corners 62, 64, 66, 68 progressively engage the edge of rectangular aperture 202 thereby allowing second stage 14 to engage a range of panel thicknesses.

Figure 9:
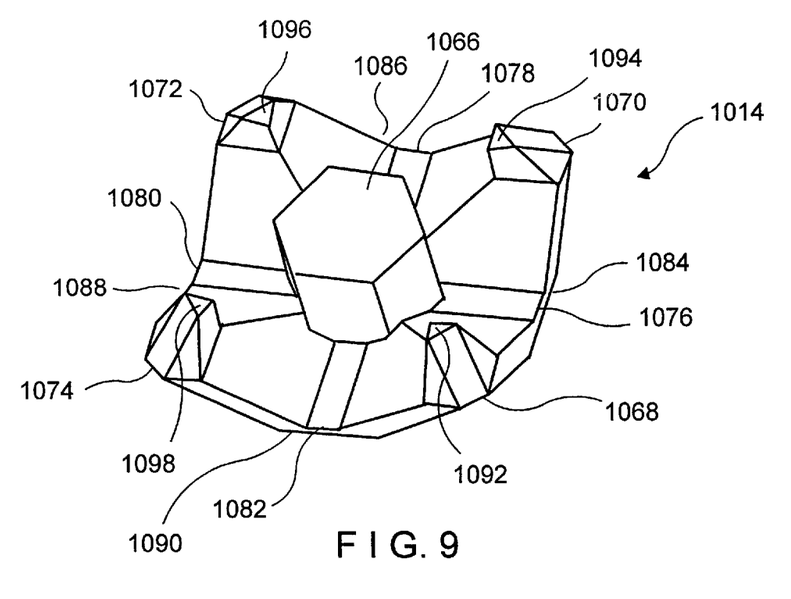
FIG. 9 is a perspective view of the second stage of the second aspect of the double quarter turn fastener of the present invention.

FIGS. 8–12 disclose second aspect of fastener assembly 1010 which include first stage 1012 (FIG. 8) and second stage 1014 (FIG. 9). First stage 1010 includes circular head 1016 which, while not illustrated, typically includes an exterior Phillips-head type surface similar to that illustrated in first aspect of fastener assembly 10. First stage 1010 includes central aperture 1018, which as shown in phantom in FIG. 10 includes portion of slightly reduced diameter 1020 followed by portion of slightly increased diameter 1022 thereby forming inverted circular ledge 1024 therebetween. First stage 1012 further includes square-shaped seat 1026 bounded by four sides 1028, 1030, 1032, 1034. Four prongs 1036, 1038, 1040, 1042 extend obliquely outwardly from inwardly adjacent from sides 1028, 1030, 1032, 1034 terminating in surfaces 1036a, 1038a, 1040a, 1042a on which hemispherically extending nubs 1044, 1046, 1048, 1050, respectively, are formed. Additionally, upwardly extending lips 1052, 1054, 1056, 1058 (see FIGS. 8 and 10) are formed on the outermost radial areas of surfaces 1036a, 1038a, 1040a, 1042a. As can be seen from FIG. 8, the exterior walls of prongs 1036, 1038, 1040, 1042 are aligned with the exterior walls of adjacent prongs thereby forming lines of a square generally at 450 angles with sides 1028, 1030, 1032, 1034 of square-shaped seat 1026.

Figure 10:
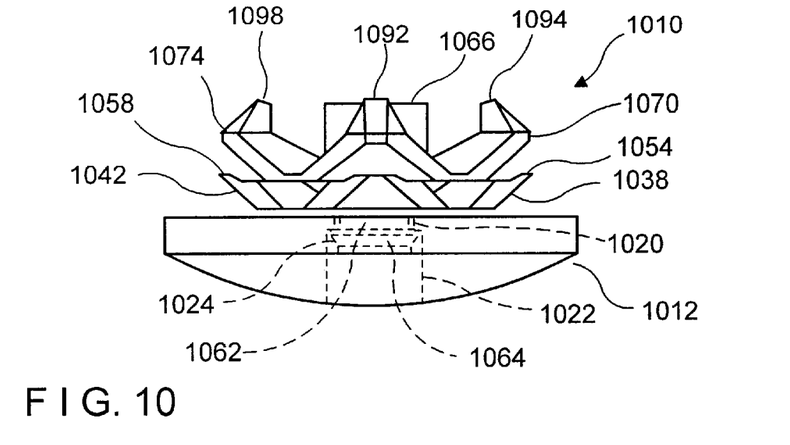
FIG. 10 is a side plan view, partially in phantom, of the installed first and second stages of the second aspect of the double quarter turn fastener of the present invention.

Second stage 1014 includes lower shaft 1062 with an annular ring 1064 which, as shown in FIG. 10, is inserted into central aperture 1018 of aperture 1018 of first stage 1012 thereby snap engaging inverted circular ledge 1024. Second stage 1014 further includes upper hexagonal shaft 1066 (see FIG. 9) raised corners 1068, 1070, 1072, 1074 which are formed by walls extending obliquely upwardly from valleys 1076, 1078, 1080, 1082 which extend from the base of upper hexagonal shaft 1066 to the mid-points of sides 1084, 1086, 1088, 1090 of second stage 1014. Raised corners 1068, 1070, 1072, 1074 further include upwardly extending prongs 1092, 1094, 1096, 1098.

Fastener assembly 1010 is typically shipped in a configuration wherein hemispherically extending nubs 1044, 1046, 1048, 1050 align with raised corners 1068, 1070, 1072, 1074.

Figure 12:
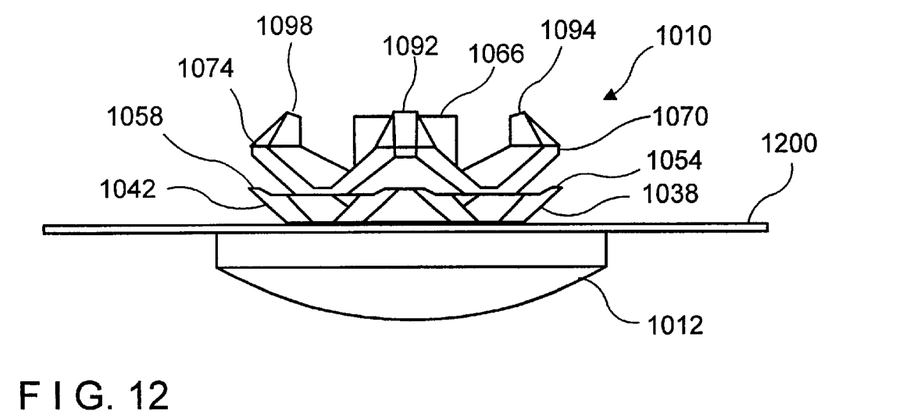
FIG. 12 is a side plan view of the first and second stages of the second aspect of the double quarter turn fastener of the present invention, installed on a thin panel and a thick panel.

FIG. 12 illustrates fastener assembly 1010 engaging a thin panel 1200. Fastener assembly 1010 is inserted into a square aperture (not shown) in thin panel 1200 and given a quarter turn so that thin panel 1200 engaged between circular head 1016 and prongs 1036, 1038, 1040, 1042. This allows fastener assembly 1010 to be fastened to a first panel and remain attached without the need for fastening a second panel.

Figure 11:
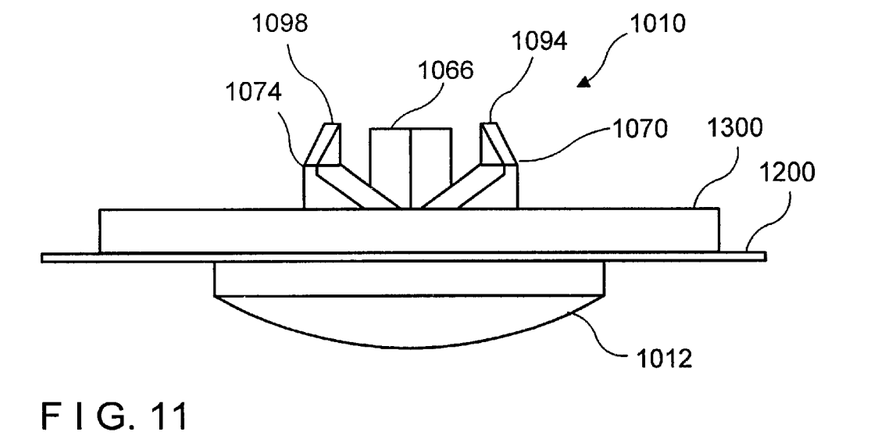
FIG. 11 is a side plan view of the first and second stages of the second aspect of the double quarter turn fastener of the present invention, installed on a single thin panel.

FIG. 11 illustrates fastener assembly 1010 engaging a thin panel 1200 and a thick panel 1300. Thick panel 1300 is placed over thin panel 1200 and fastener assembly 1010 fits through a square aperture (not shown) in thick panel 1300 which is offset 45° from the square aperture (not shown) in thin panel 1200. Second stage 1014 is then turned a quarter turn from the configuration shown in FIG. 11. Second stage 1014 rotates with respect to first stage 1012 thereby allowing the assembly to be completed. The configuration of the two quarter turn fasteners (that is, first and second stages 1012, 1014) allows two panels of varying thicknesses to be assembled together with each other.

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A fastener assembly including;
   a first element which fastens to a second element;
   said first element including a head, a seat with a plurality of sides formed on said head, prongs extending obliquely outwardly from said seat, and a first detent element;
   said second element including a second detent element for receiving said first detent element;
   wherein said first detent element includes a post extending from said head, and including flanges extending orthogonally from said post; and wherein said second detent element includes a slot which receives said flanges, and pockets formed adjacent to said slot, wherein when said first element is rotated relative to said second element, said flanges are received within said pockets; and
   wherein said prongs extend from inwardly adjacent of said sides and terminate in surfaces.

2. The fastener assembly of claim 1 wherein a number of said prongs is equal to a number of said sides.

3. The fastener assembly of claim 2 wherein said second element includes a number of chamfered corners equal to said number of said prongs.

4. The fastener assembly of claim 3 wherein said chamfered corners align with respective prongs when said first element is in an unfastened position with respect to said second element and wherein said chambered corners align with respective sides when said first element is in a fastened position with respect to said second element.

5. The fastener assembly of claim 1 wherein said surfaces are substantially parallel to said seat.

* * * * *